United States Patent
Fong

(10) Patent No.: US 8,271,906 B1
(45) Date of Patent: Sep. 18, 2012

(54) METHOD AND SYSTEM FOR USING A DYNAMIC CURSOR AREA TO FACILITATE USER INTERACTION

(75) Inventor: Spencer W. Fong, Redwood City, CA (US)

(73) Assignee: Intuit Inc., Mountain View, CA (US)

( * ) Notice: Subject to any disclaimer, the term of this patent is extended or adjusted under 35 U.S.C. 154(b) by 977 days.

(21) Appl. No.: 12/135,434

(22) Filed: Jun. 9, 2008

(51) Int. Cl.
*G06F 3/14* (2006.01)
*G06F 3/17* (2006.01)

(52) U.S. Cl. ........ 715/859; 715/810; 715/861; 345/157; 345/169; 705/14.42; 707/999.003

(58) Field of Classification Search .......... 715/200–277, 715/700–867; 700/701–866; 709/201–229; 705/14.42, 50–79; 345/30–111, 157, 169; 348/206–231.9; 707/1–10, 100–104.1, 200–206; 1/1
See application file for complete search history.

(56) References Cited

U.S. PATENT DOCUMENTS

| | | | |
|---|---|---|---|
| 5,686,938 A * | 11/1997 | Batkhan | 715/861 |
| 6,744,422 B1 * | 6/2004 | Schillings et al. | 345/169 |
| 7,107,285 B2 * | 9/2006 | von Kaenel et al. | 1/1 |
| 7,904,829 B2 * | 3/2011 | Fox et al. | 715/810 |
| 2006/0050055 A1 * | 3/2006 | Yamamoto et al. | 345/157 |
| 2010/0241507 A1 * | 9/2010 | Quinn et al. | 705/14.42 |

* cited by examiner

*Primary Examiner* — Ruay Ho
(74) *Attorney, Agent, or Firm* — Park, Vaughan, Fleming & Dowler LLP; Chia-Hsin Suen

(57) ABSTRACT

Some embodiments of the present invention provide a system that facilitates interaction with a user of a computing device. During operation, the system obtains user input from the user through a user interface of the computing device. Next, the system updates, based on the user input, a dynamic cursor area proximate to a cursor in the user interface to provide functionality-based feedback to the user at a location where the user is likely to be looking.

18 Claims, 8 Drawing Sheets

METHOD AND SYSTEM FOR USING A DYNAMIC CURSOR AREA TO FACILITATE USER INTERACTION

BACKGROUND

Related Art

The present invention relates to techniques for facilitating user interaction with a computing device. More specifically, the present invention relates to a method and system for facilitating user interaction through a dynamic cursor area provided by a user interface of the computing device.

A user typically interacts with a computing device, such as a personal computer (PC), mobile phone, personal digital assistant (PDA), and/or calculator, by providing input to and receiving output from the computing device through various input and output mechanisms. For example, the user may enter input into a PC using a keyboard or mouse and receive output from the PC via a display screen and/or speakers.

Furthermore, one or more user interfaces (UIs) in the computing device may provide mechanisms that facilitate interactions between the user and computing device. For example, a UI in a computer system may provide UI components such as a cursor, windows, menus, icons, checkboxes, text boxes, and/or radio buttons. These UI components are typically displayed to the user through a display screen connected to the computer system. This enables the user to manipulate the UI components by moving the cursor; clicking, dragging, and/or selecting areas of the UI with the cursor; and entering text and/or keyboard shortcuts into the UI.

Usability is an important consideration in designing user interfaces. In particular, usability considerations may include the efficiency with which tasks are accomplished through the UI, the user's ability to learn and master the operation of the UI, and/or the availability of feedback, help, documentation, and/or status information within the UI. For example, the user may accomplish tasks more easily and quickly if appropriate feedback and/or status information is provided to the user through the UI.

Similarly, the arrangement of user interface elements may affect the user's ability to navigate the user interface. Consequently, user satisfaction with a computing device may be highly influenced by characteristics of the user interface provided by the computing device.

SUMMARY

Some embodiments of the present invention provide a system that facilitates interaction with a user of a computing device. During operation, the system obtains user input from the user through a user interface of the computing device. Next, the system updates, based on the user input, a dynamic cursor area proximate to a cursor in the user interface to provide functionality-based feedback to the user at a location where the user is likely to be looking.

In some embodiments, the system also determines a location of the cursor within the user interface and further updates the dynamic cursor area based on the location of the cursor.

In some embodiments, the location is associated with at least one of an application, a feature, and a user interface element.

In some embodiments, the user input is obtained through an input device of the computing device.

In some embodiments, the input device is at least one of a pointing device, a button, a keyboard, an imaging device, an audio input device, and a biometric sensor.

In some embodiments, the functionality-based feedback is associated with the input device.

In some embodiments, the dynamic cursor area is updated with a representation of the user input.

In some embodiments, the dynamic cursor area is displayed at a configurable level of transparency.

In some embodiments, the dynamic cursor area is positioned at an offset from the cursor within the user interface. In these embodiments, the offset is maintained during a movement of the cursor.

In some embodiments, the dynamic cursor area is updated with information associated with the user input.

DETAILED DESCRIPTION

Figure 1:
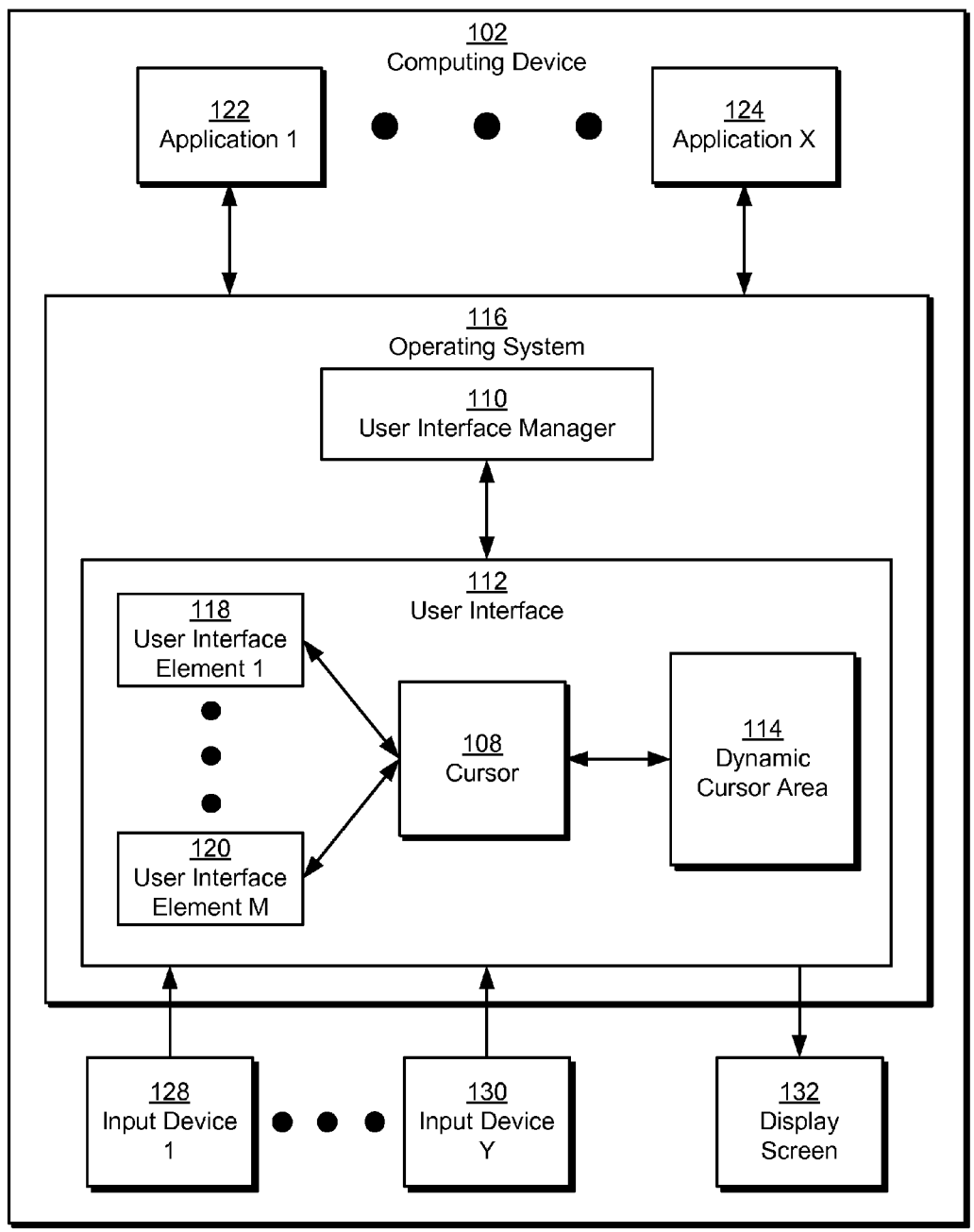
FIG. 1 shows a computing device in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system.

The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments of the invention provide a method and system for facilitating interaction with a user of a computing device. The computing device may be, for example, a personal computer (PC), a mobile phone, a personal digital assistant (PDA), a graphing calculator, a portable media player, and/or a global positioning system (GPS) receiver.

More specifically, embodiments of the invention provide a method and system for providing functionality-based feedback to the user through a dynamic cursor area within a user interface of the computing device. The dynamic cursor area may be proximate to a cursor in the user interface. In particular, the dynamic cursor area may be positioned at an offset from the cursor. Furthermore, the offset may be maintained during a movement of the cursor.

The dynamic cursor area may be updated based on user input obtained from the user. For example, the dynamic cursor area may be updated with a representation of the user input and/or with information associated with the user input. The dynamic cursor area may also be updated based on the cursor's location within the user interface.

FIG. 1 shows a computing device 102 in accordance with an embodiment of the present invention. As shown in FIG. 1, computing device 102 includes multiple applications (e.g., application 1 122, application x 124), an operating system 116, a set of input devices (e.g., input device 1 128, input device y 130), and a display screen 132. Each of these components is described in further detail below.

Computing device 102 may correspond to an electronic device that provides one or more services or functions to a user. For example, computing device 102 may operate as a mobile phone, personal computer, global positioning system (GPS) receiver, portable media player, personal digital assistant (PDA), and/or graphing calculator. In addition, computing device 102 may include an operating system 116 that coordinates the use of hardware and software resources on computing device 102, as well as one or more applications (e.g., application 1 122, application x 124) that perform specialized tasks for the user. For example, computing device 102 may include applications (e.g., application 1 122, application x 124) such as an email client, an address book, a document editor, a tax preparation application, a web browser, and/or a media player. To perform tasks for the user, applications (e.g., application 1 122, application x 124) may obtain the use of hardware resources (e.g., processor, memory, I/O components, wireless transmitter, etc.) on computing device 102 from operating system 116, as well as interact with the user through a hardware and/or software framework provided by operating system 116, as described below.

To enable interaction with the user, computing device 102 may include one or more hardware input/output (I/O) components, such as input devices (e.g., input device 1 128, input device y 130) and display screen 132. Each hardware I/O component may additionally be associated with a software driver (not shown) that allows operating system 116 and/or applications on computing device 102 to access and use the hardware I/O components.

Display screen 132 may be used to display images and/or text to one or more users of computing device 102. In one or more embodiments of the invention, display screen 132 serves as the primary hardware output component for computing device 102. For example, display screen 132 may allow the user(s) to view menus, icons, windows, emails, websites, videos, pictures, maps, documents, and/or other elements (e.g., user interface element 1 118, user interface element m 120) of a user interface 112 provided by operating system 116. Those skilled in the art will appreciate that display screen 132 may incorporate various types of display technology to render and display images. In particular, display screen 132 may be a liquid crystal display (LCD), an organic light-emitting diode (OLED) display, a surface-conducting electron-emitter display (SED), and/or other type of electronic display.

Input devices within computing device 102 may allow the user to provide user input to computing device 102. Input devices may include pointing devices (e.g., mice, touchpads, touchscreens, pointing sticks, etc.), buttons, keyboards, imaging devices (e.g., cameras, scanners, etc.), audio input devices, and/or biometric sensors (e.g., retinal scanners, fingerprint readers, etc.). Input entered by the user through the input devices may be processed by the corresponding software driver and sent to operating system 116 and/or one or more applications (e.g., application 1 122, application x 124) as one or more actions. For example, the user may specify actions to operating system 116 by typing on a keyboard, pointing and clicking using a mouse, speaking voice commands through a microphone, and/or pressing one or more buttons.

Operating system 116 and/or the application(s) (e.g., application 1 122, application x 124) may use the input from the input device(s) to perform one or more tasks, as well as update user interface 112 in response. Images corresponding to user interface 112 may be generated by a user interface manager 110 within operating system 116 and sent to a screen driver, which may display the images on display screen 132 as a series of pixels. As a result, the user may interact with computing device 102 by using one or more input devices to provide input to operating system 116 and/or applications and receiving output from operating system 116 and/or applications through display screen 132.

As shown in FIG. 1, user interface 112 includes a cursor 108 which may be controlled by the user via a pointing device (e.g., mouse, touchpad, touchscreen, pointing stick, trackball, etc.) to enter input into computing device 102. More specifically, the pointing device may allow the user to point to, select, drag, drop, and/or perform other cursor-related actions on one or more areas of display screen 132 using cursor 108.

In addition to serving as a visual indicator within user interface 112, cursor 108 may also include functionality to provide information and/or feedback related to an application (e.g., application 1 122, application x 124), feature, and/or user interface element (e.g., user interface element 1 118, user interface element m 120) of computing device 102. In particular, user interface manager 110 may update a dynamic cursor area 114 located in the proximity of cursor 108 in user interface 112 to provide functionality-based feedback in response to user input obtained from the user. The functionality-based feedback may include a representation of the user input and/or information associated with the user input. For example, the functionality-based feedback may include help content related to the user input, a result of processing the user input, and/or additional information to facilitate the completion of the user's task. Uses of dynamic cursor area 114 are further described with respect to FIGS. 2-6.

As mentioned above, dynamic cursor area 114 may be displayed at a location that is proximate to cursor 108. In other words, dynamic cursor area 114 may be positioned at an offset from cursor 108 within user interface 112. For example, dynamic cursor area 114 may be positioned to the left, right, top, bottom, and/or at a diagonal from cursor 108. The offset may be established (e.g., at a number of pixels) such that dynamic cursor area 114 enters the user's field of vision if the user glances at cursor 108 on display screen 132. Furthermore, the offset may be maintained during a movement of cursor 108. As a result, cursor 108 and dynamic cursor area 114 may behave and/or function as a single entity within user interface 112, with dynamic cursor area 114 displayed as an attribute of cursor 108.

In one or more embodiments of the invention, dynamic cursor area 114 is updated based on the input device (e.g., input device 1 128, input device y 130) through which the user input is obtained. For example, if the user input corresponds to text that is entered using a keyboard, dynamic cursor area 114 may be updated with a representation of the text. On the other hand, if the user input corresponds to a biometric signature obtained using a fingerprint reader, retinal scanner, and/or other biometric sensor, dynamic cursor area 114 may be updated with results of biometric analysis for verifying the user's identity. As a result, dynamic cursor area 114 may include functionality to provide feedback associated with different input methods within the same application, feature, and/or user interface element.

In one or more embodiments of the invention, dynamic cursor area 114 is further updated based on the location of cursor 108 within user interface 112. In particular, the location of cursor 108 with respect to an application, feature, and/or user interface element may influence the content displayed within dynamic cursor area 114. In other words, certain areas within user interface 112 may cause dynamic cursor area 114 to behave in a particular fashion if cursor 108 is located within or close to those areas. For example, dynamic cursor area 114 may be updated with a description of a user interface element if cursor 108 is positioned over the user interface element. Similarly, dynamic cursor area 114 may be updated as cursor 108 crosses the boundary between two open application windows and/or two windows within the same application.

User interface manager 110 may also include mechanisms to prevent the obstruction of user interface elements by dynamic cursor area 114. For example, dynamic cursor area 114 may be sized, shaped, and/or oriented with respect to cursor 108 such that user interface elements such as text are as visible as possible to the user. In addition, dynamic cursor area 114 may be displayed at a level of transparency that is configurable by the user and/or user interface manager 110. Applications and/or features with densely packed user interface elements may thus incorporate the use of dynamic cursor area 114 without detracting from the usability of the user interface elements.

Figure 2:
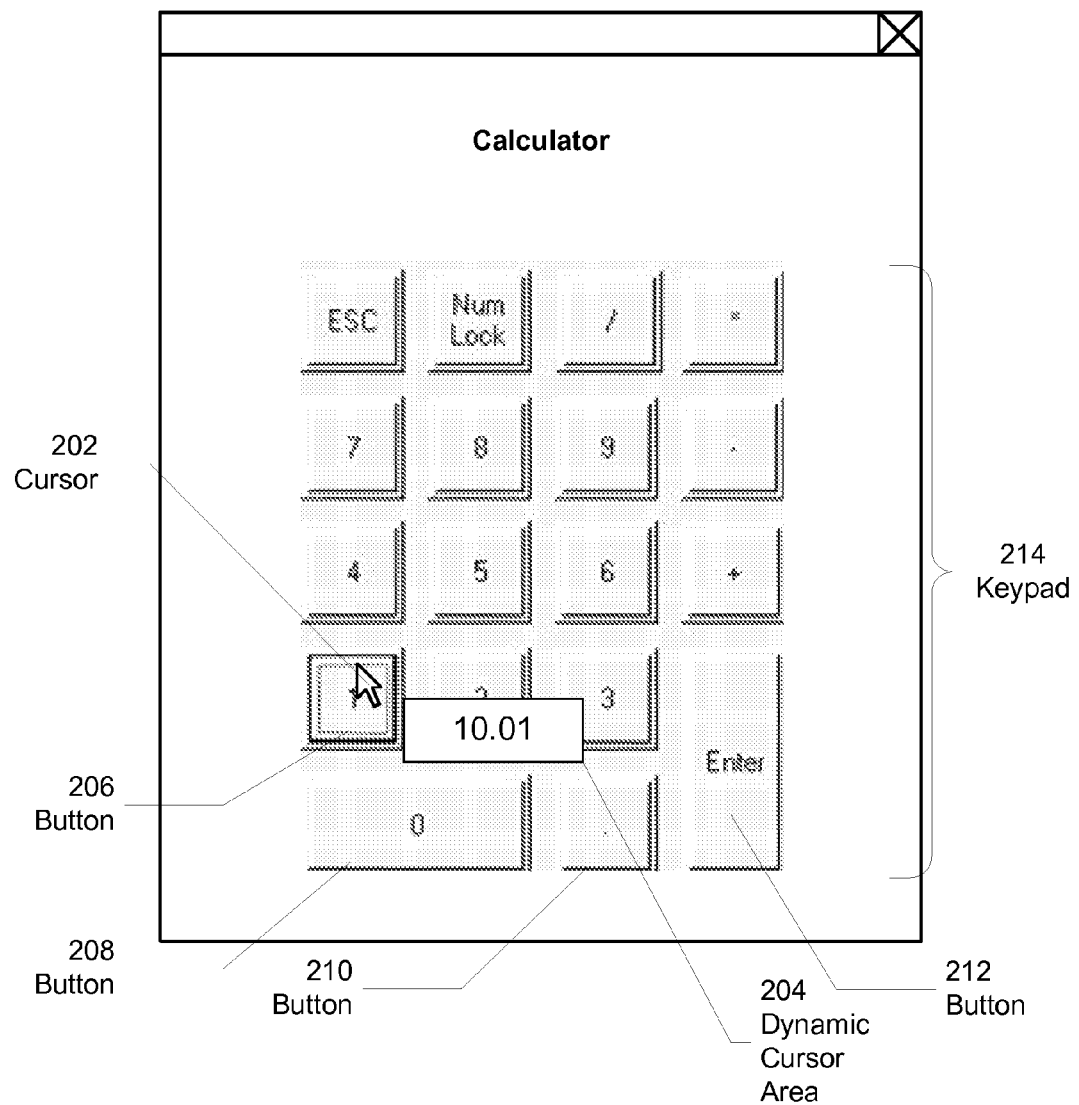
FIG. 2 shows an exemplary screenshot of a user interface in accordance with an embodiment of the present invention.

FIG. 2 shows an exemplary screenshot of a user interface in accordance with an embodiment of the present invention. More specifically, FIG. 2 shows a screenshot of a calculator application in accordance with an embodiment of the present invention. As shown in FIG. 2, the application includes a keypad 214 containing a set of buttons 206-212. To utilize the functionality of the calculator, the user may click on buttons 206-212 and/or other buttons within keypad 214 using cursor 202. In particular, the user may perform basic arithmetic functions by entering a combination of numeric digits (e.g., 0-9), decimal points (e.g., button 210), arithmetic operators (e.g., +, −, *, /), and/or button 212 (e.g., "Enter") into the application. The application may further allow the user to enter input through mechanisms other than cursor 202. For example, the user may type arithmetic operands and operators into the application using a keyboard and/or physical keypad.

However, the screenshot of FIG. 2 does not include a dedicated field that displays the input entered by the user. Instead, a dynamic cursor area 204 next to cursor 202 is used to provide functionality-based feedback regarding the user's input at a location where the user is likely to be looking As described above, dynamic cursor area 204 may be updated with a representation of the user input provided by the user. In other words, the contents of dynamic cursor area 204 (i.e., "10.01") may correspond to numerical user input provided by selecting button 206, button 208, button 210, button 208, and button 206 in sequence using cursor 202. Alternatively, dynamic cursor area 204 may reflect user input that is entered using an input device that does not utilize cursor 202, such as a keyboard.

Furthermore, while dynamic cursor area 204 is opaque, rectangular, and located to the bottom right of cursor 202, dynamic cursor area 204 may be displayed using a different shape, size, transparency, and/or orientation with respect to cursor 202 within the user interface. Such parameters associated with the display of dynamic cursor area 204 may be configured by the user, by the application, and/or by a user interface manager associated with the user interface of FIG. 2. For example, dynamic cursor area 204 may include physical attributes that reflect the user's preferences regarding size, shape, orientation, and/or transparency. Dynamic cursor area 204 may also be modified by the application and/or user interface manager to facilitate use of the application by the user. For example, dynamic cursor area 204 may be displayed at a size, shape, orientation, and/or transparency such that obstruction of keypad 214 by dynamic cursor area 204 is minimized. As a result, dynamic cursor area 204 may improve the ease and efficiency of using the calculator application by providing dynamic feedback associated with user input entered into the application.

Figure 3:
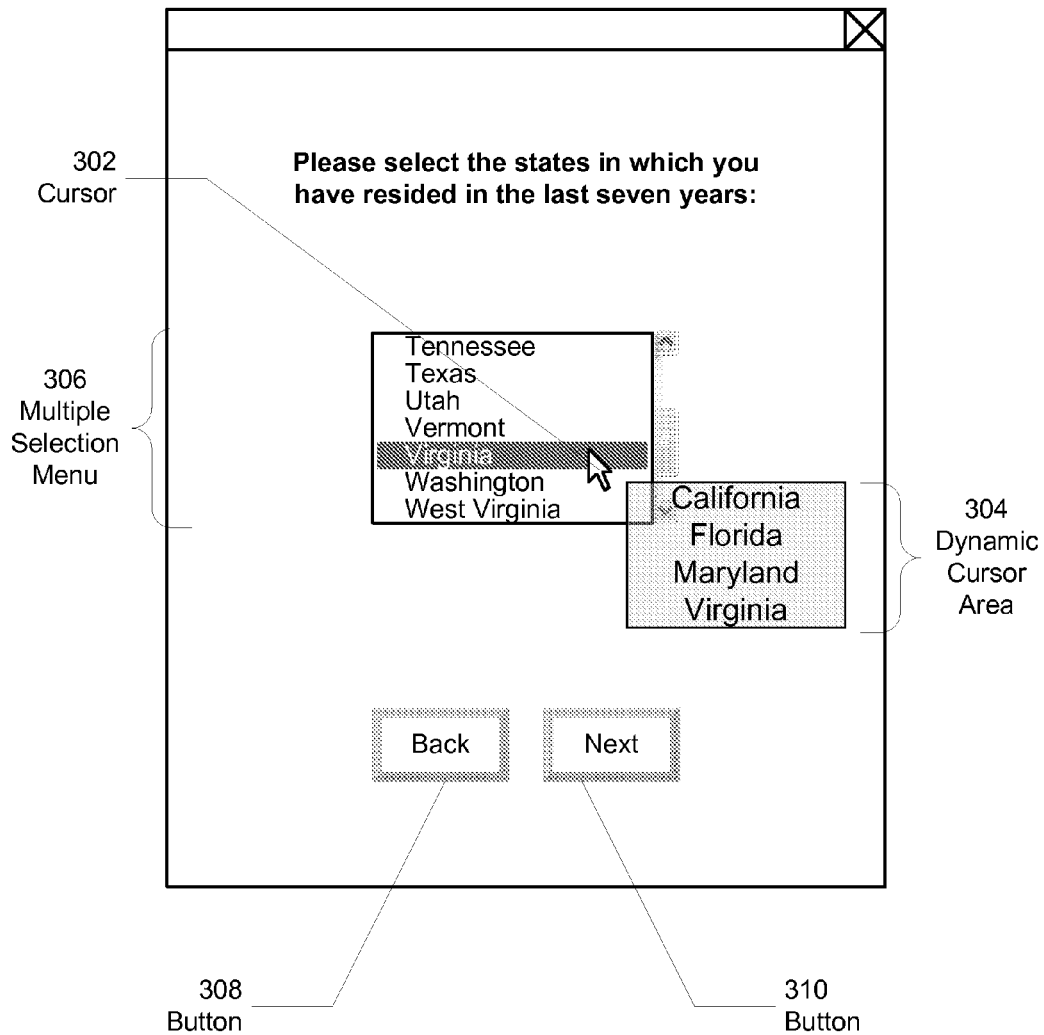
FIG. 3 shows an exemplary screenshot of a user interface in accordance with an embodiment of the present invention.

FIG. 3 shows an exemplary screenshot of a user interface in accordance with an embodiment of the present invention. More specifically, FIG. 3 shows a screenshot of a multiple selection menu 306 in accordance with an embodiment of the present invention. As shown in FIG. 3, multiple selection menu 306 may be used to obtain a list of states in which the user has resided in the last seven years. The user may select one or more items (i.e., states) within multiple selection menu 306 using a cursor 302 and/or a modifier key on a keyboard, such a control key.

Furthermore, a dynamic cursor area 304 next to cursor 302 displays items from multiple selection menu 306 that have already been selected by the user. In particular, dynamic cursor area 304 shows a list of four items (e.g., "California," "Florida," "Maryland," "Virginia") selected by the user from multiple selection menu 306. However, only one of the items (i.e., "Virginia") is immediately viewable within the screenshot of FIG. 3. As a result, dynamic cursor area 304 may facilitate the entry of user input by allowing the user to view dynamic feedback regarding the items selected within multiple selection menu 306 without scrolling through the contents of multiple selection menu 306. In other words, mistakes and/or omissions in selected items within multiple selection menu 306 may be easily caught by the user through dynamic cursor area 304.

Unlike the dynamic cursor area (i.e., dynamic cursor area 204) of FIG. 2, dynamic cursor area 304 is displayed at a certain level of transparency within the user interface of FIG. 3. As mentioned previously, the level of transparency, as well as the size, shape, and orientation of dynamic cursor area 304, may be configured by the user, application, and/or a user interface manager to facilitate interaction between the user and the user interface.

The user may also return to a previous screen in the user interface by selecting button 308 using cursor 302, or the user may proceed to a next screen in the user interface by selecting button 310 using cursor 302. Because the previous screen and/or next screen may contain different user interface elements and/or request different types of user input from the screenshot of FIG. 3, the behavior of dynamic cursor area 304 may change as the user moves between screens in the user interface or even between different user interface elements within the screenshot of FIG. 3. For example, dynamic cursor area 304 may be updated to reflect a description of the previous screen or next screen if cursor 302 is moved over button 308 or button 310, respectively. As a result, the content in dynamic cursor area 304 may be based on both the location of cursor 302 within the user interface and the collection of user interface elements currently displayed within the user interface.

Figure 4:
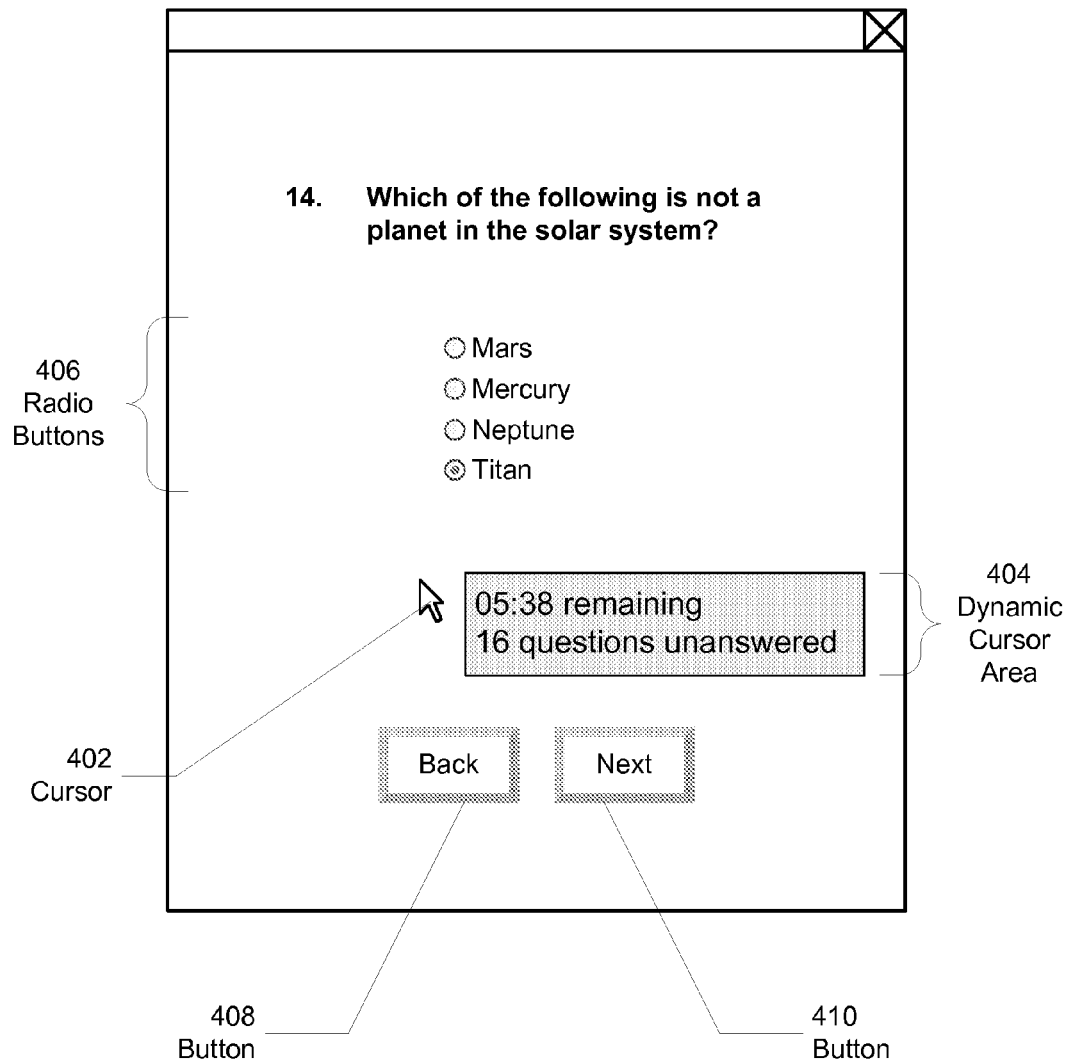
FIG. 4 shows an exemplary screenshot of a user interface in accordance with an embodiment of the present invention.

FIG. 4 shows an exemplary screenshot of a user interface in accordance with an embodiment of the present invention. More specifically, FIG. 4 shows a screenshot of a testing application in accordance with an embodiment of the present invention. The screenshot of FIG. 4 includes a set of radio buttons 406 from which the user may select an answer to a test question. As with other user interface elements, selection of a radio button may be accomplished by clicking using cursor 402 and/or by using other input mechanisms, such as pressing a combination of keys on a keyboard (e.g., tab, enter, etc.).

Within the testing application, a dynamic cursor area 404 may be used to display information related to the user's progress through the test. In particular, dynamic cursor area 404 includes a timer that displays the amount of time remaining in the test (e.g., "05:38 remaining"), as well as the number of unanswered questions remaining in the test (e.g., "16 questions unanswered"). In other words, dynamic cursor area 404 includes functionality-based feedback that is generated in response to both previously entered user input (e.g., starting the test, previously answered questions) and user input entered within the screenshot of FIG. 4 (e.g., selection of a radio button, position of cursor 402). Dynamic cursor area 404 may also be periodically (e.g., every second) updated to reflect the amount of time and/or the number of unanswered questions remaining in the test.

As discussed above, dynamic cursor area 404 may also be updated based on the location of cursor 402 within the user interface. For example, if cursor 402 is positioned over button 408, dynamic cursor area 404 may display status information related to a previous question in the test, such as the previous question and/or the user's answer to the previous question. Similarly, if cursor 402 is positioned over button 410, dynamic cursor area 404 may display information regarding the next question in the test, such as text containing the question itself and/or one or more answer choices. The user may also proceed to the previous question or next question by selecting button 408 or button 410, respectively.

Figure 5:
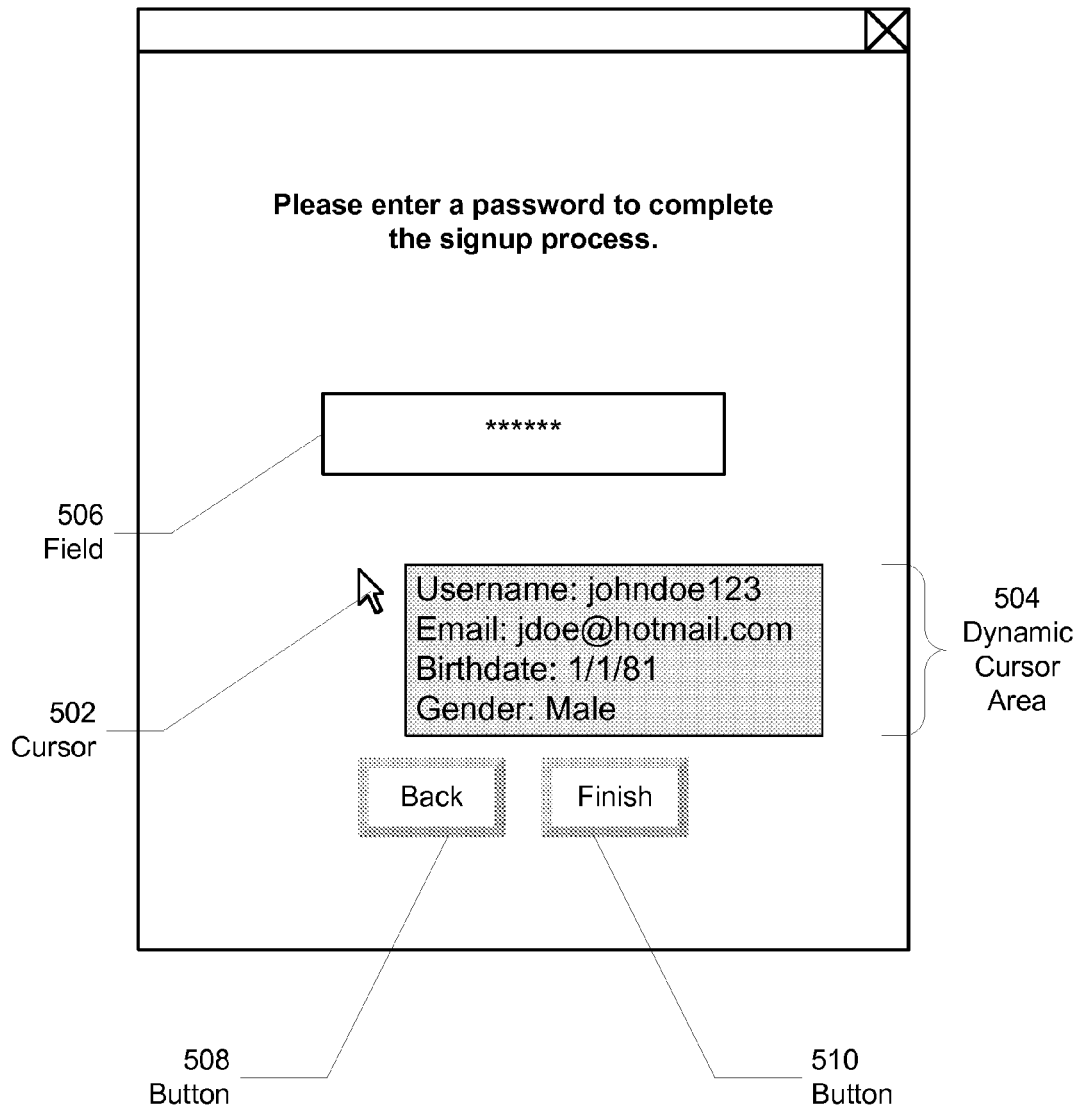
FIG. 5 shows an exemplary screenshot of a user interface in accordance with an embodiment of the present invention.

FIG. 5 shows an exemplary screenshot of a user interface in accordance with an embodiment of the present invention. More specifically, FIG. 5 shows a screenshot of a password entry module in accordance with an embodiment of the present invention. As shown in FIG. 5, a password may be entered by the user into a field 506 provided by the user interface. In addition, the password may be entered to complete a user registration or signup process for a piece of software and/or a website. To enter the password, the user may type into a keyboard and/or other input device associated with the user interface.

Although a cursor 502 may not be used to enter user input into field 506, a dynamic cursor area 504 proximate to cursor 502 may still include functionality-based feedback associated with the user input. The functionality-based feedback shown in dynamic cursor area 504 may be associated with user input entered at previous stages of the user registration or signup process. In particular, dynamic cursor area 504 contains a username (e.g., "johndoe123") entered by the user, an email address (e.g., "jdoe@hotmail.com") for the user, the user's birthdate (e.g., "Jan. 1, 1981"), and the user's gender (e.g., "Male"). As a result, the user may review details associated with the registration process without changing screens in the user interface. As discussed previously, the size, shape, transparency, and/or other physical attributes of dynamic cursor area 504 may be configured by the user and/or by the user interface to facilitate user interaction through the user interface.

If the user input shown in dynamic cursor area 504 is accurate and/or approved by the user, the user may select button 510 to finish the registration process. On the other hand, the user may select button 508 to return to previous screens in the user interface and edit details entered into the previous screens. The user may also position cursor 502 over button 508 or button 510 to obtain additional information related to the functionality provided by each button.

Figure 6A:
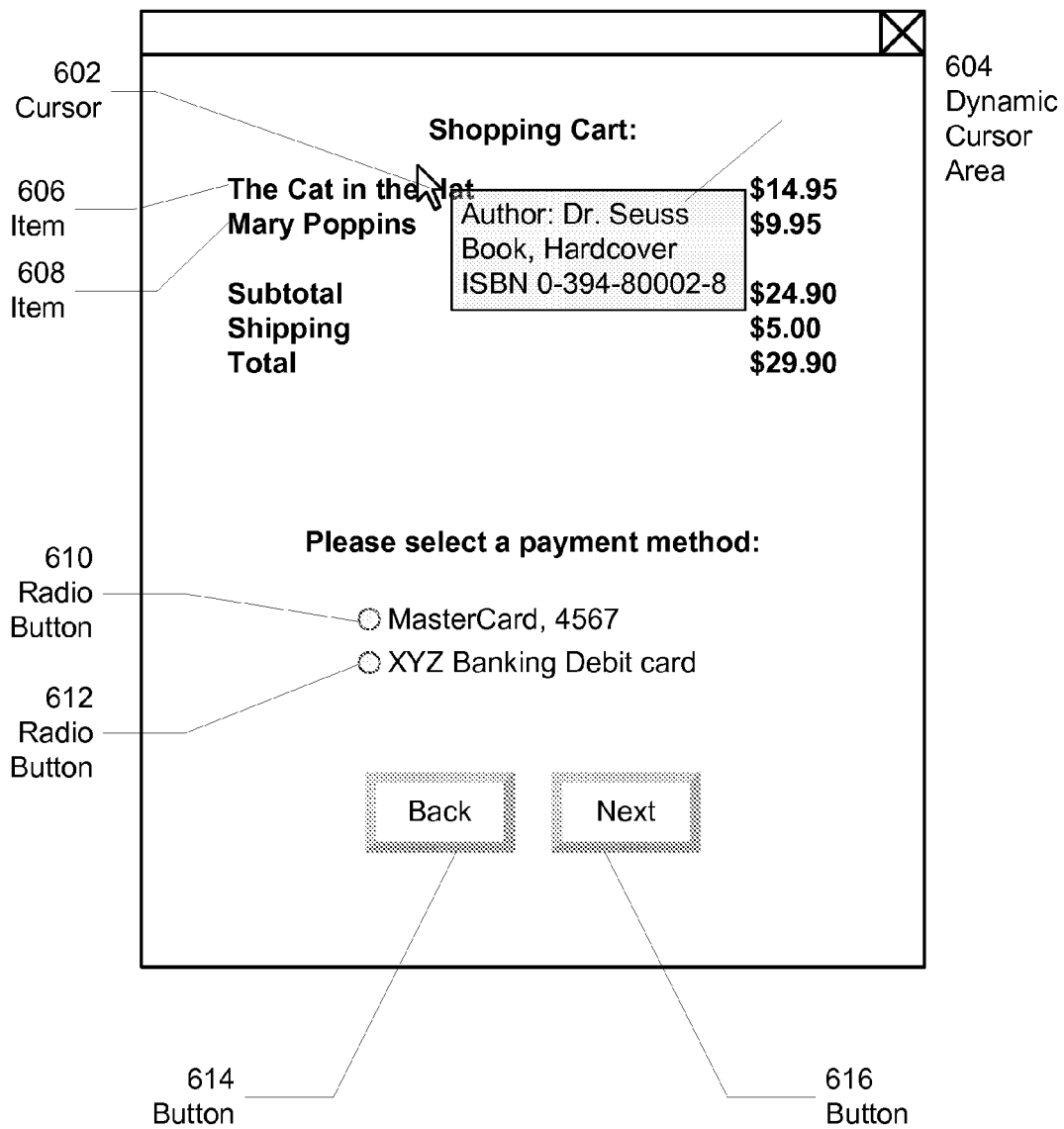
FIG. 6A shows an exemplary screenshot of a user interface in accordance with an embodiment of the present invention.

FIG. 6A shows an exemplary screenshot of a user interface in accordance with an embodiment of the present invention. More specifically, FIG. 6A shows a screenshot of a shopping cart feature within a user interface in accordance with an embodiment of the present invention. The shopping cart feature includes two sections: a list of items 606-608 and associated prices related to purchasing the items in the shopping cart, and a set of radio buttons 610-612 from which the user may select a payment method for items 606-608 in the shopping cart. After selecting a payment method using a radio button 610-612, the user may proceed to the next step in purchasing the items in the shopping cart by selecting button 616 with a cursor 602. Alternatively, the user may return to a screen shown immediately prior to the screenshot of FIG. 6A by selecting button 614 using cursor 602.

Within FIG. 6A, cursor 602 is positioned over item 606 (e.g., "The Cat in the Hat") in the shopping cart. Furthermore, a dynamic cursor area 604 next to cursor 602 includes information associated with item 606, a book. In particular, dynamic cursor area 604 displays an author (e.g., "Dr. Seuss"), a description of the item (e.g., "Book, Hardcover") and an International Standard Book Number (ISBN) (e.g., "0-394-80002-8"). Likewise, the user may position cursor 602 over item 608 to view information about item 608 in dynamic cursor area 604. Furthermore, the placement of cursor 602 in other areas of the user interface may cause dynamic cursor area 604 to be updated in other ways, as explained below with respect to FIG. 6B.

Dynamic cursor area 604 may also be displayed using physical attributes that facilitate user interaction with the user interface. As shown in FIG. 6A, dynamic cursor area 604 is displayed at a level of transparency that enables underlying text in the shopping cart to be viewed. Furthermore, dynamic cursor area 604 is positioned such that most of the text within the shopping cart is unobstructed by dynamic cursor area 604. As a result, dynamic cursor area 604 may improve rather than detract from the usability of the user interface illustrated in FIG. 6A.

Figure 6B:
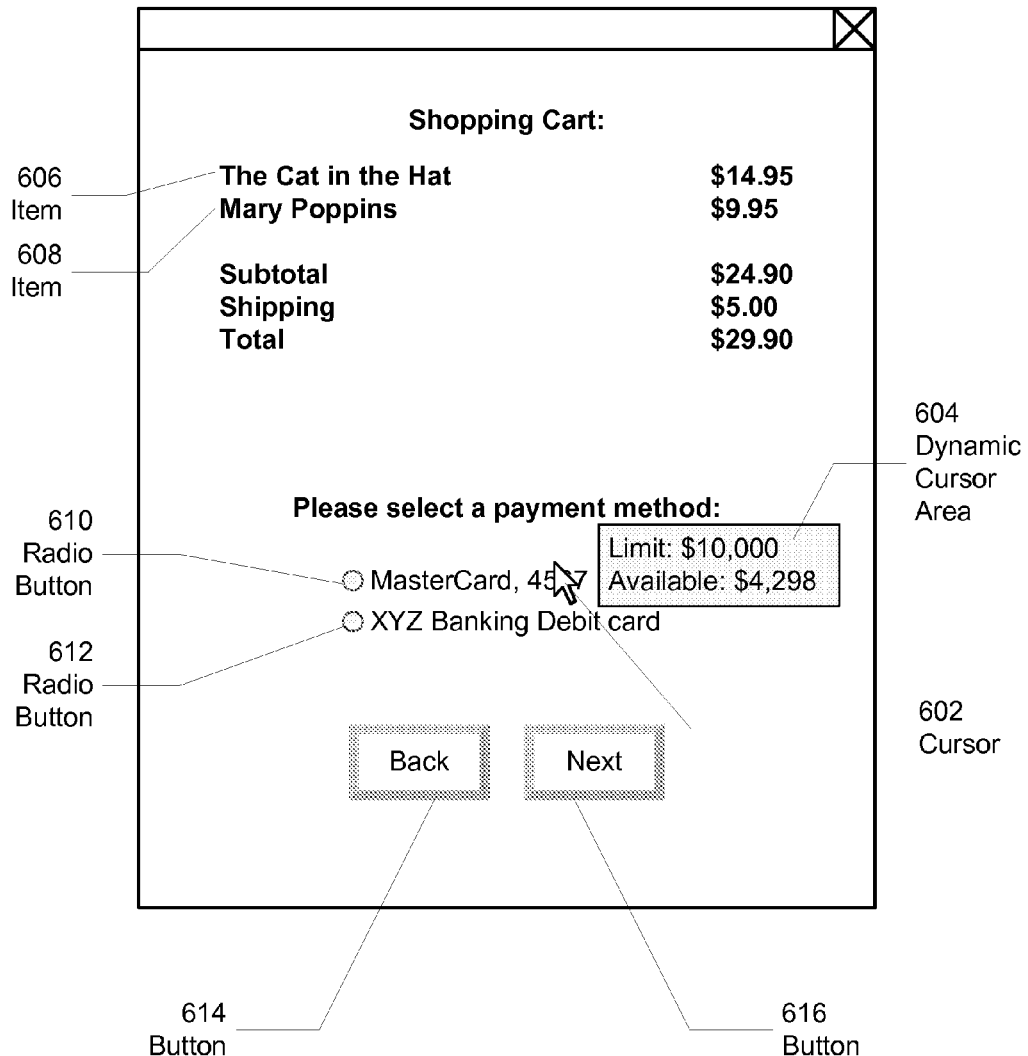
FIG. 6B shows an exemplary screenshot of a user interface in accordance with an embodiment of the present invention.

FIG. 6B shows an exemplary screenshot of a user interface in accordance with an embodiment of the present invention. The user interface of FIG. 6B corresponds to the user interface of FIG. 6A with cursor 602 placed over radio button 610. Instead of displaying information related to items 606-608, dynamic cursor area 604 provides information related to a payment method (e.g., "MasterCard, 4567") that may be selected using radio button 610. In particular, dynamic cursor area 604 includes a credit limit (e.g., "$10,000") associated with the payment method, as well as available credit (e.g., "$4,298") from the payment method. As a result, dynamic cursor area 604 is updated based on a new location of cursor 602 and/or user input related to the movement of cursor 602 to its position within FIG. 6B. Furthermore, dynamic cursor area 604 is placed next to cursor 602 such that dynamic cursor area 604 does not obstruct text within the user interface of FIG. 6B.

Figure 7:
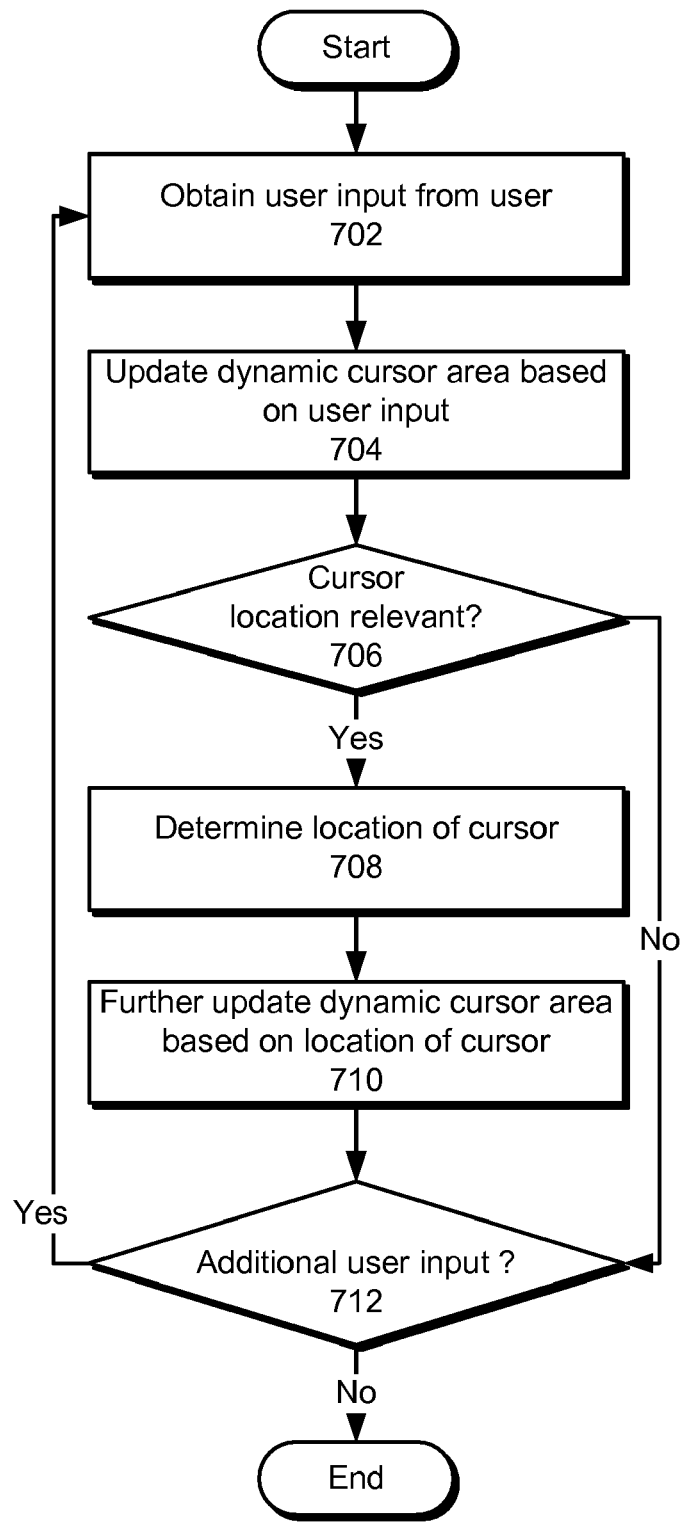
FIG. 7 shows a flowchart illustrating the process of facilitating user interaction using a dynamic cursor area in accordance with an embodiment of the present invention.

FIG. 7 shows a flowchart illustrating the process of facilitating user interaction using a dynamic cursor area in accordance with an embodiment of the present invention. In one or more embodiments of the invention, one or more of the steps may be omitted, repeated, and/or performed in a different order. Accordingly, the specific arrangement of steps shown in FIG. 7 should not be construed as limiting the scope of the invention.

Initially, user input is obtained from the user (operation 702). The user input may be entered into a computing device, such as a PC, mobile phone, PDA, portable media player, and/or GPS receiver. The computing device may include a user interface that interacts with the user by receiving input from the user and providing output to the user through a display screen. The user input may further be obtained through an input device of the computing device, such as a pointing device, button, keyboard, imaging device, audio input device, and/or biometric sensor. The user input may include, for example, a mouse click, a button press, a cursor movement, and/or use of an imaging or audio input device.

Next, a dynamic cursor area associated with a cursor within the user interface is updated based on the user input (operation 704). The dynamic cursor area may be proximate to the cursor (e.g., located at an offset from the cursor). Moreover, the offset may be maintained during a movement of the cursor. As a result, the cursor and dynamic cursor area may behave as a single entity within the user interface. Consequently, the dynamic cursor area may facilitate user interaction by displaying functionality-based feedback, such as a representation of the user input and/or information associated with the user input, at a location where the user is likely to be looking.

The location of the cursor may also be relevant to the display of content within the dynamic cursor area (operation 706). In particular, the behavior of the dynamic cursor area may change as the cursor is placed on top of or near certain applications, features, and/or user interface elements (e.g., form fields, buttons, text, images, menus, windows, toolbars, etc.). The location of the cursor may be particularly relevant if the user input received in operation 702 includes a cursor movement. If the cursor's location is not relevant to the update of the dynamic cursor area, the dynamic cursor area is only updated based on the user input obtained in operation 702.

If the cursor's location is relevant, the location of the cursor is determined (operation 708) from the user interface. For example, pixel coordinates corresponding to the cursor's position within the display screen may be used as the cursor's location. Next, the dynamic cursor area is further updated based on the location of the cursor (operation 710). For example, if the cursor is positioned on top of a button, the dynamic cursor area may be updated with information related to the actions triggered by selecting the button. The dynamic cursor area may also include previously entered user input associated with the button, such as user input entered into a screen to which the button leads.

Additional user input from the user may cause the dynamic cursor area to display other content (operation 712). If additional user input from the user exists, the user input is received (operation 702) and the dynamic cursor area updated based on the user input (operation 704). Furthermore, if the location of the cursor is relevant to the update of the dynamic cursor area (operation 706), the location of the cursor is determined (operation 708) and the dynamic cursor area is updated based on the location of the cursor (operation 710). Consequently, the dynamic cursor area may continuously be updated to provide functionality-based feedback to the user as long as the user provides user input to the user interface.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating interaction with a user of a computing device, comprising:
   receiving textual user input from the user through a user interface of the computing device;
   displaying a cursor and a separate dynamic cursor; and
   displaying the received textual user input in the dynamic cursor, wherein the dynamic cursor is located at an offset from the cursor, and wherein when the cursor moves, the dynamic cursor moves to maintain the offset from the cursor.

2. The method of claim 1, further comprising:
   determining a location of the cursor within the user interface; and
   further updating the dynamic cursor based on the location of the cursor.

3. The method of claim 2, wherein the location is associated with at least one of an application, a feature, and a user interface element.

4. The method of claim 1, wherein the dynamic cursor is updated with a representation of the user input.

5. The method of claim 1, wherein the dynamic cursor is displayed at a configurable size, shape, orientation, or transparency.

6. The method of claim 1, wherein the dynamic cursor is updated with information associated with the user input.

7. A system for facilitating interaction with a user of a computing device, comprising:
   a user interface of the computing device, comprising:
      a cursor; and
      a dynamic cursor separate from the cursor; and
   a user interface manager configured to:
      receive textual user input from the user through the user interface;
      display the cursor; and
      display the received textual user input in the dynamic cursor, wherein the dynamic cursor is located at an offset from the cursor, and wherein when the cursor moves, the dynamic cursor moves to maintain the offset from the cursor.

8. The system of claim 7, wherein the user interface manager is further configured to:
   determine a location of the cursor within the user interface; and
   further update the dynamic cursor based on the location of the cursor.

9. The system of claim 8, wherein the location is associated with at least one of an application, a feature, and a user interface element.

10. The system of claim 7, wherein the dynamic cursor is updated with a representation of the user input.

11. The system of claim 7, wherein the dynamic cursor is displayed at a configurable size, shape, orientation, or transparency.

12. The system of claim 7, wherein the dynamic cursor is updated with information associated with the user input.

13. A non-transitory computer-readable storage medium storing instructions that when executed by a computer cause the computer to perform a method for facilitating interaction with a user of a computing device, the method comprising:

receiving textual user input from the user through a user interface of the computing device;

displaying a cursor and a dynamic cursor that is separate from the cursor; and displaying the received textual user input in the dynamic cursor, wherein the dynamic cursor is located at an offset from the cursor, and wherein when the cursor moves, the dynamic cursor moves to maintain the offset from the cursor.

14. The computer-readable storage medium of claim 13, the method further comprising:

determining a location of the cursor within the user interface; and further updating the dynamic cursor based on the location of the cursor.

15. The computer-readable storage medium of claim 14, wherein the location is associated with at least one of an application, a feature, and a user interface element.

16. The computer-readable storage medium of claim 13, wherein the dynamic cursor is updated with a representation of the user input.

17. The computer-readable storage medium of claim 13, wherein the dynamic cursor is displayed at a configurable size, shape, orientation, or transparency.

18. The computer-readable storage medium of claim 13, wherein the dynamic cursor is updated with information associated with the user input.

\* \* \* \* \*